United States Patent
Ellis et al.

(10) Patent No.: US 6,604,240 B2
(45) Date of Patent: Aug. 5, 2003

(54) INTERACTIVE TELEVISION PROGRAM GUIDE SYSTEM WITH OPERATOR SHOWCASE

(75) Inventors: Michael D. Ellis, Boulder, CO (US); Edward B. Knudson, Littleton, CO (US); William L. Thomas, Bixby, OK (US); Bruce L. Davis, Lake Oswego, OR (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 08/944,162

(22) Filed: Oct. 6, 1997

(65) Prior Publication Data

US 2001/0010095 A1 Jul. 26, 2001

(51) Int. Cl.$^7$ .......................... H04N 7/087; H04N 7/16; H04N 7/14
(52) U.S. Cl. ..................... 725/45; 725/44; 725/52; 348/563
(58) Field of Search .................. 348/1, 906, 7, 348/563, 564; 455/2; 725/39–61, 114–119

(56) References Cited

U.S. PATENT DOCUMENTS

| | | | | |
|---|---|---|---|---|
| 4,706,121 A | | 11/1987 | Young | 358/142 |
| 4,991,011 A | | 2/1991 | Johnson et al. | 358/141 |
| 5,038,211 A | | 8/1991 | Hallenbeck | 358/142 |
| 5,404,505 A | * | 4/1995 | Levinson | 725/105 |
| 5,410,344 A | * | 4/1995 | Graves et al. | 348/1 |
| 5,416,508 A | | 5/1995 | Sakuma et al. | 348/3 |
| 5,479,266 A | * | 12/1995 | Young et al. | 348/734 |
| 5,485,197 A | * | 1/1996 | Hoarty | 348/7 |
| 5,523,796 A | | 6/1996 | Marshall et al. | 348/589 |
| 5,534,911 A | * | 7/1996 | Levitan | 348/1 |
| 5,579,055 A | * | 11/1996 | Hamilton et al. | 348/476 |
| 5,585,838 A | * | 12/1996 | Lawler et al. | 348/13 |
| 5,585,866 A | | 12/1996 | Millet et al. | 348/731 |
| 5,589,892 A | | 12/1996 | Knee et al. | |
| 5,600,364 A | | 2/1997 | Hendricks et al. | |
| 5,619,274 A | | 4/1997 | Roop et al. | 348/461 |
| 5,623,613 A | * | 4/1997 | Rowe et al. | 395/353 |
| 5,635,978 A | * | 6/1997 | Alten et al. | 348/7 |
| 5,657,072 A | * | 8/1997 | Aristides et al. | 348/906 |
| 5,659,350 A | | 8/1997 | Hendricks et al. | |
| 5,666,645 A | * | 9/1997 | Thomas et al. | 455/6.1 |
| 5,694,176 A | * | 12/1997 | Bruette et al. | 348/563 |
| 5,758,257 A | * | 5/1998 | Herz et al. | 455/2 |
| 5,758,259 A | * | 5/1998 | Lawler | 455/5.1 |

(List continued on next page.)

FOREIGN PATENT DOCUMENTS

WO    WO 94/14284    6/1994    ............ H04N/7/16

OTHER PUBLICATIONS

US 6,118,443, 9/2000, Allison et al. (withdrawn)*

Primary Examiner—Andrew Faile
Assistant Examiner—Reuben M. Brown
(74) Attorney, Agent, or Firm—Fish & Neave; Alexander Shvarts

(57) ABSTRACT

A system is provided in which an interactive television program guide is implemented on user television equipment such as a set-top box. The program guide provides an operator showcase in the form of one or more operator showcase television listings screens, each of which contains a set of television listings information. The sets of television listings information are generated by querying a database of television listings data in a database in the set-top box. Each database query is based on content criteria previously selected by the cable system operator or other service provider. The service provider is also able to define the format with which the television listings information is displayed in the television listings screens. A title and logos may also be selected by the service provider for each screen. The operator showcase television listings screens may therefore by customized and branded by the service provider. The user may access multiple operator showcase television listings screens using a centralized operator showcase menu.

54 Claims, 14 Drawing Sheets

U.S. PATENT DOCUMENTS 5,760,821 A * 6/1998 Ellis et al. .................. 348/906
5,801,747 A * 9/1998 Bedard .......................... 348/1
5,850,218 A * 12/1998 LaJoie et al. ................. 725/45
5,880,768 A * 3/1999 Lemmons et al. ............. 348/1
6,008,803 A * 12/1999 Rowe et al. ................. 345/327
6,075,551 A * 6/2000 Berezowski et al. ........... 348/9

* cited by examiner

66

INFO

TITLE

DESCRIPTION

AIRTIMES

| LOGO | PPV LISTINGS - BY TITLE | LOGO |

| CHANNEL | TIME | DATE | TITLE |
|---------|---------|------|---------|
| REQ 1 | 7:30 PM | 9/12 | PROGRAM |
| REQ 4 | 6:00 AM | 9/13 | PROGRAM |
| REQ 3 | 7:00 AM | 9/15 | PROGRAM |
| REQ 1 | 3:00 PM | 9/11 | PROGRAM |
| REQ 2 | 4:00 PM | 9/12 | PROGRAM |

PRESS "DOWN" TO VIEW MORE LISTINGS

| CHANNEL | TIME | DATE | TITLE |
|---------|--------|-------|---------|
| REQ 1 | 9:00PM | 11/3 | EVENT C |
| REQ 1 | 8:00PM | 11/25 | EVENT H |
| REQ 2 | 8:30PM | 11/20 | EVENT A |
| REQ 1 | 9:00PM | 11/15 | EVENT B |

74 — LOGO
72 — SPECIAL EVENTS
74 — LOGO

PRESS "DOWN" TO VIEW MORE SPECIAL EVENTS

| DATE(S) | TITLE |
|---|---|
| 3/12 | PACKAGE V |
| 3/12-3/14 | PACKAGE A |
| 3/15 | PACKAGE S |
| 3/14 | PACKAGE G |

LOGO | SPORTS PACKAGES | LOGO

INTERACTIVE TELEVISION PROGRAM GUIDE SYSTEM WITH OPERATOR SHOWCASE

BACKGROUND OF THE INVENTION

This invention relates to interactive television program guide systems, and more particularly, to program guide systems that allow television service providers such as cable operators to provide showcases for various types of program offerings.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listing by theme (e.g., movies, sports, etc.) or by title (i.e, alphabetically). A user may view additional information on a program by placing a highlight region on a desired program listing and pressing an "info" button. The user may purchase a pay program from the program guide by placing the highlight region on a program listing and pressing an "OK" button.

Although a user is often able to find information on a program of interest by searching for the program with the tools available in the program guide (e.g., by searching for listings in a particular category), this process requires that the user take an active role in locating the information. If a user desires a more passive experience, the user may not venture beyond the display screens in the program guide that present simple time-ordered lists of program information. As a result, the user may not be made aware of many of the cable system operator's offerings.

It is therefore an object of the present invention to provide an interactive television program guide that enhances the ability of a service provider to supply users with information on the programming available from the service provider.

SUMMARY OF THE INVENTION

This and other objects of the invention are accomplished in accordance with the principles of the present invention by providing an interactive television program guide that allows a service provider such as a cable system operator, satellite system operator, or broadcast system operator to customize the type of television listings that are made available to the user in the form of an operator showcase. The operator showcase may be accessed by the user through a menu of television display screen options each of which corresponds to a different operator showcase television listings screen. For example, a television display screen option might be "sports packages" and the corresponding television listings screen might therefore contain a set of television listings on various available packages of sports programming that are available for purchase. Because the television listings screens are easily accessible in a central location in the program guide menu structure, the operator showcase provides an attractive way for the service provider to promote programming.

The service provider may brand the operator showcase by selecting a title and logos for each operator showcase television listings screen. In addition, the set of television listings information that is displayed in a given television listings screen is determined based on content criteria that are preselected by the service provider. The program guide uses the content criteria to query a database of television listings data periodically provided to the set-top box from a program guide database in a main facility. The results of the database query (i.e., the set of television listings information that satisfy the content criteria) are displayed in the operator showcase television listings screen.

The service provider may also select the format for each operator showcase television listings screen. For example, the service provider may select the format of a time-ordered list, a channel-ordered, list, an alphabetically-ordered list, or a display format containing a promotional video barker, etc.

A user may select a given item from the set of television listings information. For example, the user may position a highlight region on top of a program listing using cursor buttons on a remote control. Pressing an "info" button on the remote control directs the program guide to display additional information on the selected item. Pressing an "order" button directs the program guide to provide the user with an opportunity to purchase the selected item.

Further features of the invention, its nature and various advantages will be more apparent from the accompanying drawings and the following detailed description of the preferred embodiments.

BRIEF DESCRIPTION OF THE DRAWINGS

FIG. 5 is a view of an illustrative display screen containing additional information on a selected item from a set of television listings information in an operator showcase television listings screen in accordance with the present invention.

FIG. 7 is a view of an illustrative operator showcase television listings screen for displaying pay programs in an alphabetically-ordered list in accordance with the present invention.

FIG. 8 is a view of an illustrative operator showcase television listings screen for displaying special events in accordance with the present invention.

FIG. 11 is a view of an illustrative operator showcase television listings screen for displaying packages of sports programming in accordance with the present invention.

DETAILED DESCRIPTION OF THE PREFERRED EMBODIMENTS

Figure 1:
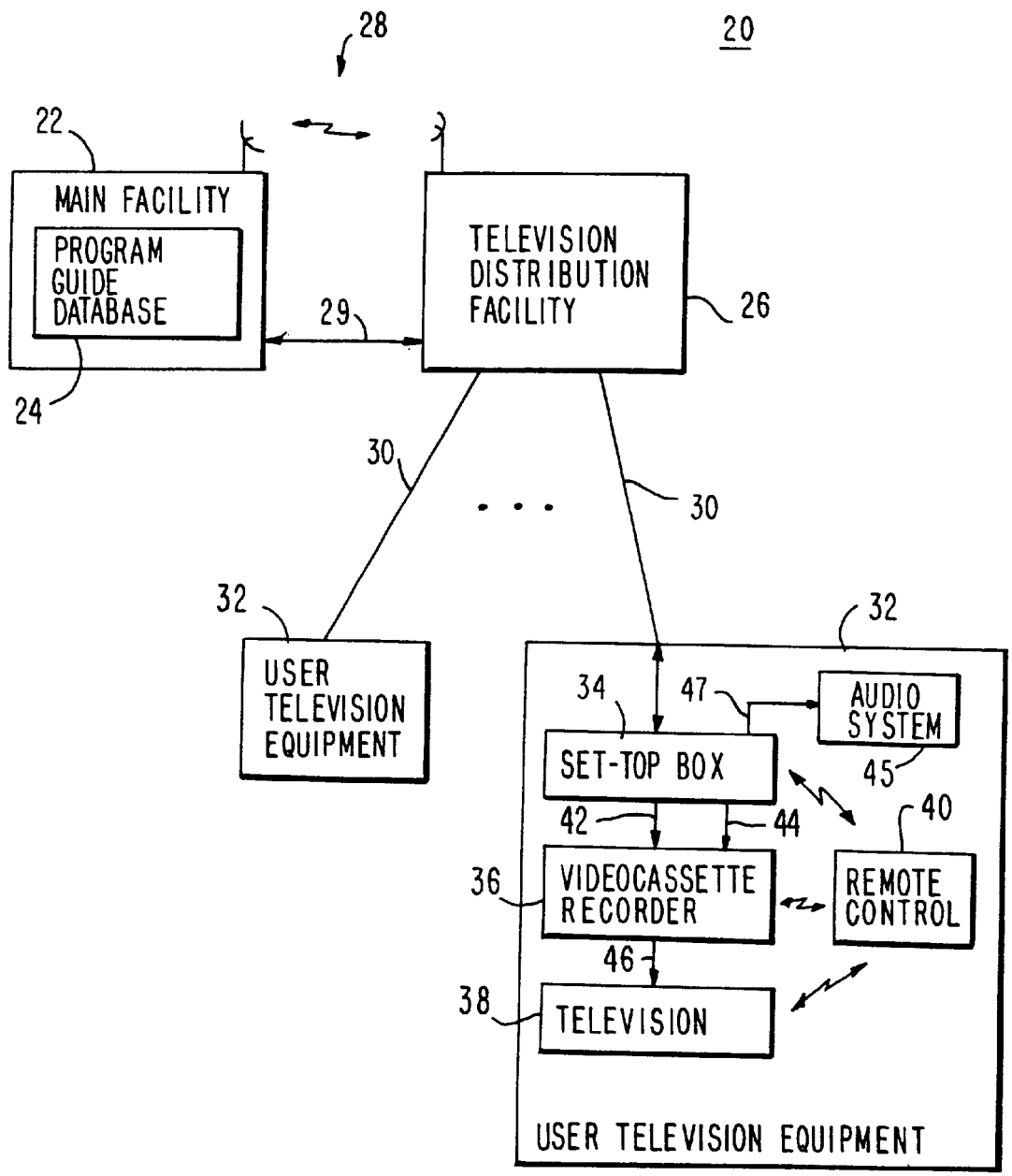
FIG. 1 is a schematic diagram of an interactive program guide system in accordance with the present invention.

An illustrative program guide system 20 in accordance with the present invention is shown in FIG. 1. Main facility 22 provides television program data from program guide database 24 to television distribution facility 26 via communications link 28. Link 28 may be a satellite link, a telephone network link, a cable or fiber optic link, a microwave link, a combination of such links, or any other suitable communications path. If it is desired to transmit video signals (e.g., for promotional videos) over link 28 in addition to data signals, a relatively high bandwidth link such as a satellite link may generally be preferred to a relatively low bandwidth link such as a telephone line. Information from television distribution facility 26 may be provided to main facility 22 via communications link 29. An illustrative communications link 29 is a modem link over a telephone network. Television distribution facility 26 may be a cable system headend, a broadcast distribution facility, or a satellite television distribution facility. Television distribution facility 26 is operated by a service provider (e.g., a cable system operator, a satellite television system operator, or a broadcast television system operator).

The program data transmitted by main facility 22 to television distribution facility 26 includes television program listings data such as program times, channels, titles, descriptions, etc. Transmitted program data also includes pay program data such as pricing information for individual programs, subscription channels, and packages, time windows for ordering programs, channels and packages, telephone numbers for placing orders that cannot be impulse ordered, etc. If desired, some of this data may be provided using data sources at facilities other than main facility 22. For example, data related to pay program order processing (e.g., billing data and the like) may be generated by an order processing and billing system that is separate from television distribution facility 26.

Television distribution facility 26 distributes the program data to multiple users via communications paths 30. Each user has user television equipment 32. Program data may be distributed to user television equipment 32 periodically (e.g., once each week). Television distribution facility 26 may also poll user equipment 32 periodically for certain information (e.g., pay program account information or information regarding programs that have been purchased and viewed using locally-generated authorization techniques).

User television equipment 32 typically contains equipment such as set-top box 34, an optional videocassette recorder 36, and television 38. Set-top box 24 may be controlled by remote control 40 or other user input interface such as a wireless keyboard, mouse, trackball, etc.

Set-top box 34 contains a microprocessor and other circuitry for executing instructions to support an interactive television program guide with pay-per-view services. The program guide may be implemented on set-top box 34 or may be implemented on user television equipment other than a set-top box if desired. For clarity, the present invention will be illustrated in connection with a set-top box implementation.

Communications paths 30 preferably have sufficient bandwidth to allow television distribution facility 26 to distribute scheduled television programming, pay programming, promotional videos, and other video information to user equipment 32 in addition to program data. If desired, program data may be distributed by one or more distribution facilities that are similar to but separate from television distribution facility 26 using communications paths that are separate from communications paths 30.

Certain functions such as pay program purchasing may require user equipment 32 to transmit data to distribution facility 26 over communications paths 30. If desired, such data may be transmitted over telephone lines or other separate communications paths (not shown). If functions such as these are provided using facilities separate from television distribution facility 26, some of the communications with user equipment 32 may be made directly to the separate facilities.

Multiple television and audio channels (analog, digital, or both analog and digital) may be provided to set-top box 34 via communications path 30. The television channels may include normal television channels, pay programming channels, and channels used to transmit promotional videos. During normal television viewing, the user tunes set-top box 34 to a desired one of these channels. The signal for that television channel may be provided at video output 42 as a radio-frequency (RF) signal on a predefined channel (e.g., channel 3 or 4) or as a demodulated video signal. The video signal at output 42 is received by optional videocassette recorder 36, so that the user may record programs. Program recording and other features may be controlled by set-top box 34 using control path 44. Audio signals (e.g., for digital music channels) may be provided to audio system 45 via output 47.

Television 38 may receive RF or demodulated video signals from videocassette recorder 36 via path 46. The video signals on path 46 may either be generated by videocassette recorder 36 when playing back a prerecorded videocassette or may by passed through from set-top box 34. The video signals provided to television 38 may contain real-time video signals for broadcast television programs, pay programs, or promotional videos. For example, if set-top box 34 is tuned to a particular channel, the video signals for that channel may be provided to television 38. Set-top box 34 also displays various program guide screens on television 38, which may contain television listings information and full-screen or partial-screen promotional videos.

Remote control 40 may have cursor keys, an "enter," "select," or "OK" button, a "guide" button, a "record" button, an "info" button, and various other control buttons. When the user presses the "guide" button, set-top box 34 invokes the interactive program guide and displays an appropriate screen of programming listings on television 38.

A typical program guide display is a grid or other suitable table or list of television program listings. Rows of listings may be associated with different television channels and columns may be associated with different scheduled broadcast times for the programs (e.g., 9:00 PM, 9:30 PM, and 10:00 PM).

Grids or tables of program listings and other program guide services may be accessed using any suitable technique. For example, set-top box 34 may provide a menu on television 38 such as menu 48 shown in FIG. 2. In menus such as menu 48 of FIG. 2 and other program guide display screens, a highlight region such as highlight region 50 may be used to define the current position of the user. The user may position highlight region 50 using the cursors on remote control 40 (FIG. 1) and may make menu selections by pressing the "OK" button or a similar button. With menu 48, a user can select from the menu options "program listings" to view television program listings information, "messages" to view messages from the cable system operator, "favorites" to enter a set-up routine related to user preferences, and "operator showcase" (this label is configurable by the operator) to view customized display screens containing television program listings and promotional videos.

If desired, the functions of the dedicated "OK," "guide," "record," and "info" buttons and various other control buttons on remote control 40 may be provided in the form of suitable menu options that the user may select using the cursor keys and a button such as the "OK" button. In addition, other dedicated buttons may be provided on remote control 40 if desired.

Figure 2:
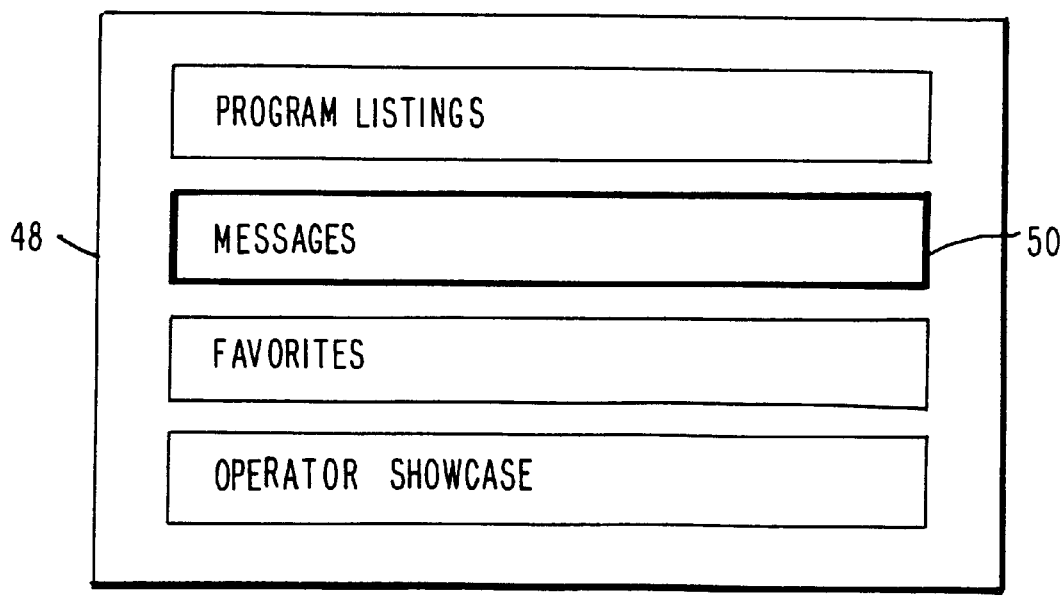
FIG. 2 is a view of a display screen containing an illustrative menu for selecting among various program guide options in accordance with the present invention.
Figure 3:
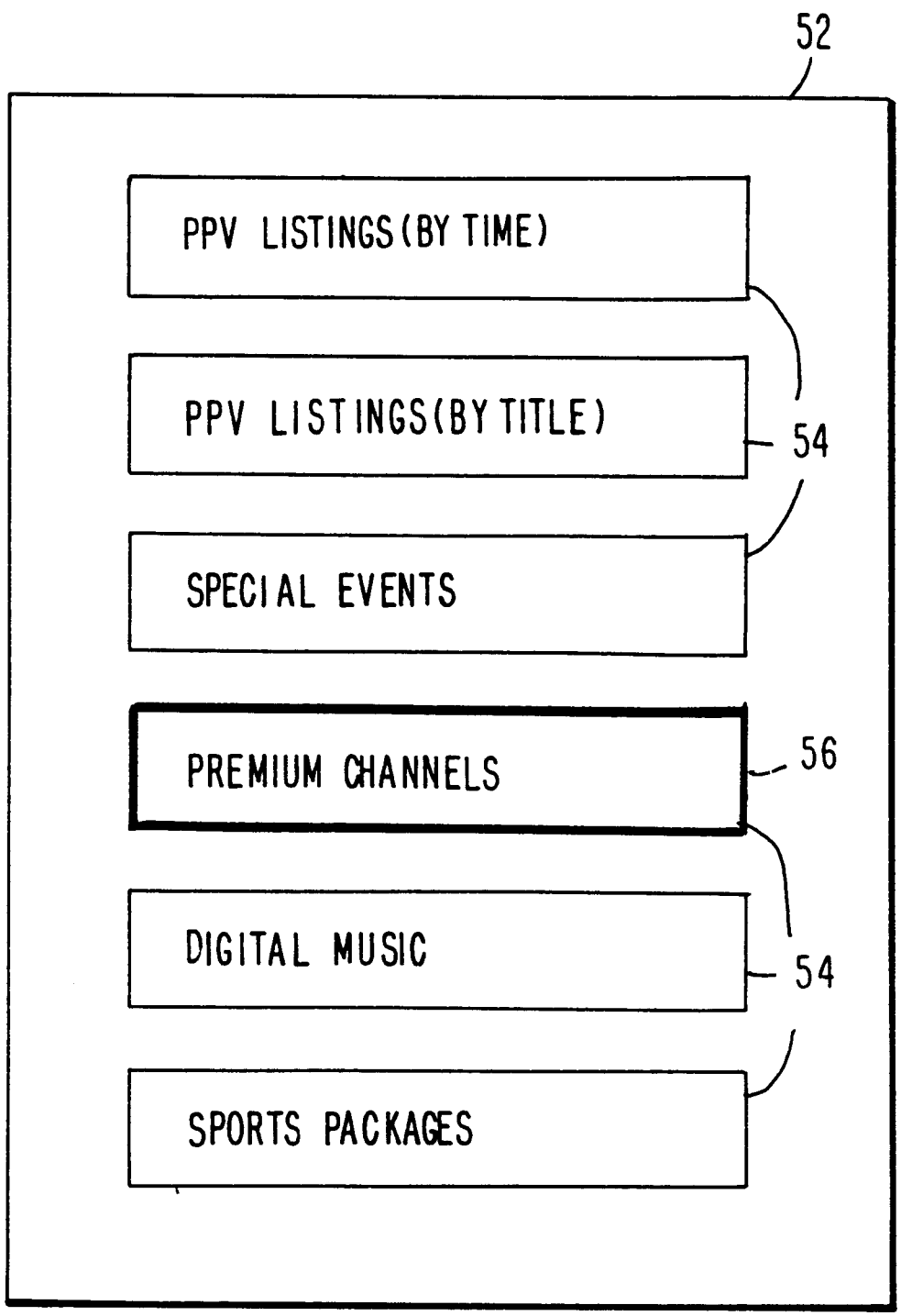
FIG. 3 is a view of a display screen containing an illustrative operator showcase menu in accordance with the present invention.

When a user selects the option "operator showcase" from menu 48 of FIG. 2, a menu such as operator showcase menu 52 of FIG. 3 may be displayed. If desired, operator showcase menu 52 may be integrated into menu 48 so that no user selection from menu 48 is required to view menu 52. Operator showcase menu 52 provides the user with an opportunity to select one of a number of television display screen options 54 using highlight 56. Each television display screen option 54 is associated with a customized operator showcase television listings screen. The display screen options 54 shown in FIG. 3 are illustrative only. Any suitable type of television display screen options may be provided. Display screen options 54 may be configured by the operator as desired.

Because the operator showcase television listings screens may all be accessed through the "operator showcase" option in menu 48, the operator showcase television listings screens provide a centralized location in the program guide menu structure in which the user may obtain a large amount of information about the service provider's programming (particularly pay programming).

Figure 4:
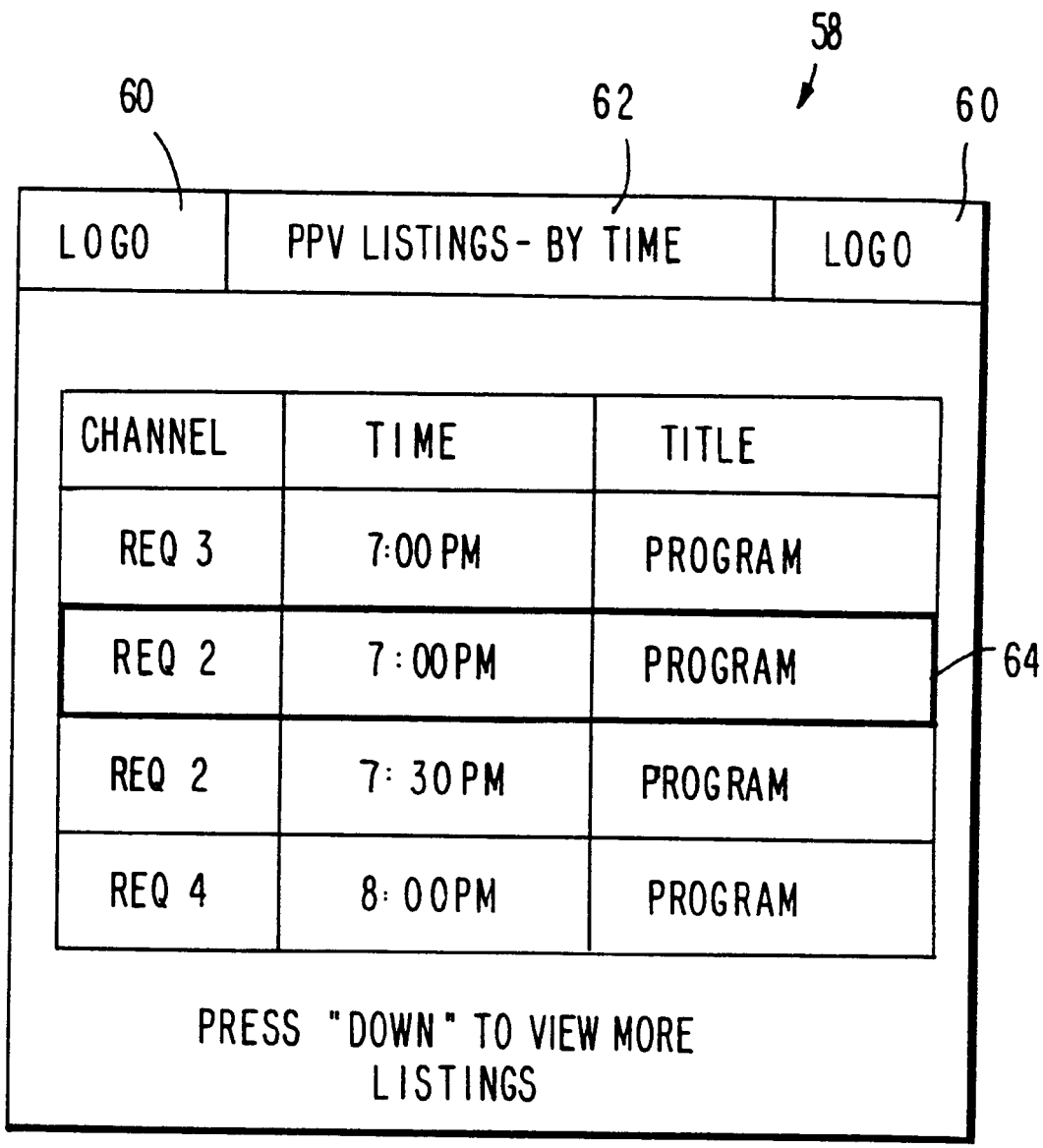
FIG. 4 is a view of an illustrative operator showcase television listings screen for displaying pay programs in a time-ordered list in accordance with the present invention.

If the user selects the display screen option 54 entitled "PPV listings (by time)," the program guide displays a time-ordered list of pay-per-view television programs, as shown in operator showcase television listings screen 58 of FIG. 4. Television listings screen 58 and the other television listings screens associated with the operator showcase television display screen options 54 may each be provided with logos 60 and a title 62 selected by the service provider. Logos allow the service provider to brand the television listings screens. Titles allow the service provider to label the television listings screens.

Figure 5:
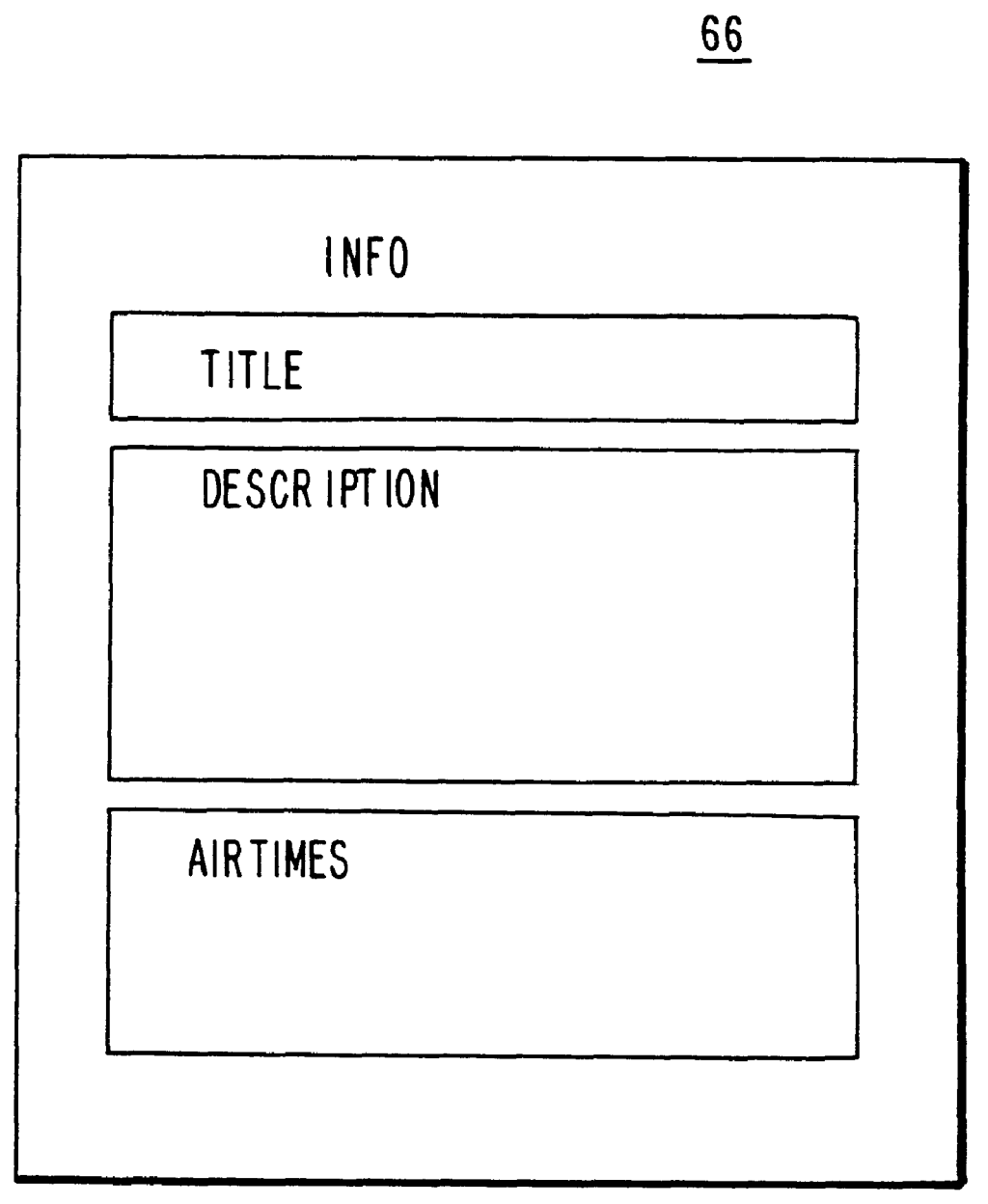

The user may select a pay program from the displayed list of pay programs in television listings screen 58 using highlight region 64. Once highlight region 64 has been placed on a given program listing (e.g., using cursor keys), pressing the "info" button directs the program guide to display additional information on the selected program. The additional information may be displayed using information display screen 66 of FIG. 5. Information display screen may contain any suitable information on the selected listing, such as a program title, program description, ratings information, reviews, etc. Pressing the "info" button when the highlighted item is a subscription channel or a package of pay programs or channels directs the program guide to display an information screen that contains additional information on that channel or package.

Figure 6:
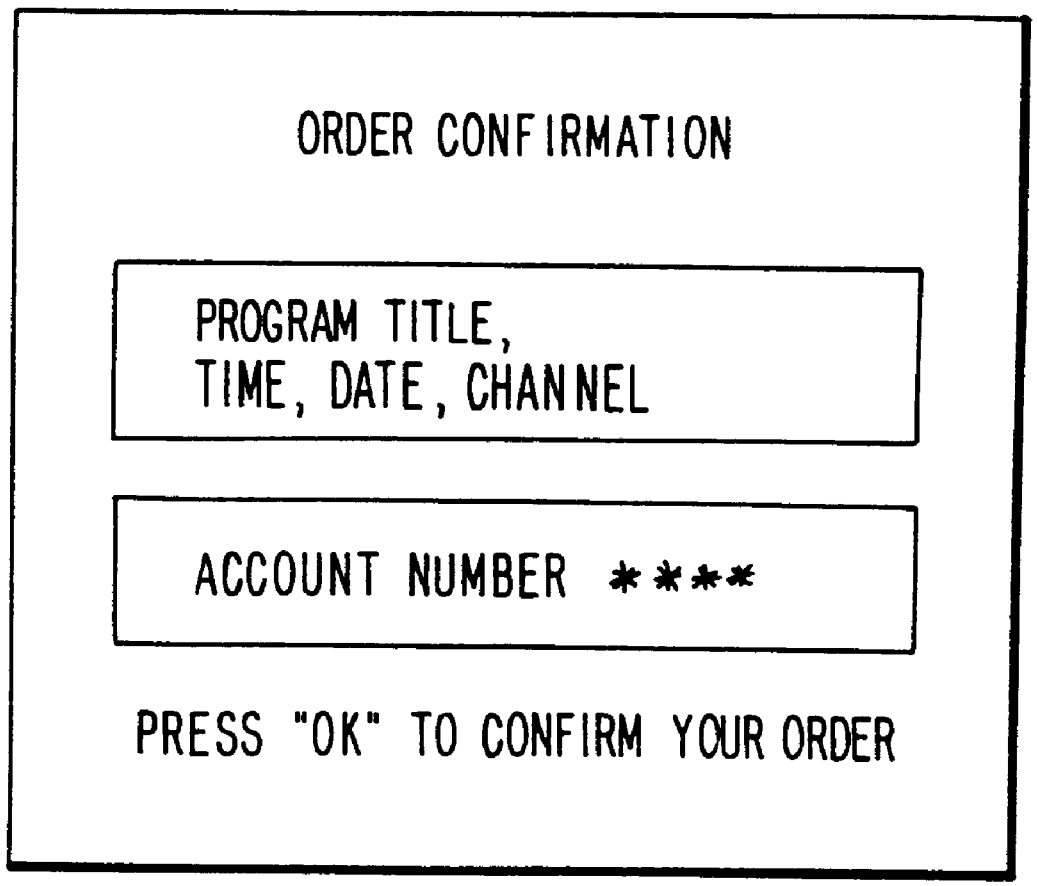
FIG. 6 is a view of an illustrative display screen used to confirm the purchase of a selected item from a set of television listings information in an operator showcase television listings screen in accordance with the present invention.

If the user presses the "OK" button after highlighting a program on television listings screen 58 of FIG. 4, the program guide may display one or more menus that provide the user with an opportunity to confirm the purchase of the selected program. Typically, such menus contain the channel, scheduled broadcast date and time, and price for the selected program. These menus provide the user with an opportunity to enter a personal identification number (PIN) or other account information and typically provide the user with another opportunity to press "OK" to confirm purchase of the program. One such illustrative order confirmation menu is shown in FIG. 6, but any other suitable menu or menus may be used to confirm the user's purchases if desired.

Another type of operator showcase television listings screen that may be provided is shown in FIG. 7. Television listings screen 68 of FIG. 7 contains an alphabetically-ordered list of pay programs. Television listings screen 68 may be accessed by the user by selecting the television display screen option 54 entitled "PPV listings (by title)" of FIG. 3.

If the user selects the television display screen option 54 entitled "special events," the program guide may display special events operator showcase television listings screen 70 of FIG. 8. The title "special events" is displayed in title block 72 and logos are displayed in logo regions 74. The listed special events typically include pay events such as special sporting events, important boxing matches, wrestling matches, playoffs, championship games, concerts, awards programs, special interest programs, etc. Information on the time, date, and channel of the listed events may also be provided. The user may view additional information on the items listed in a television listings screen using cursors or other suitable arrangement to scroll to an item that is lower in the list.

Figure 9:
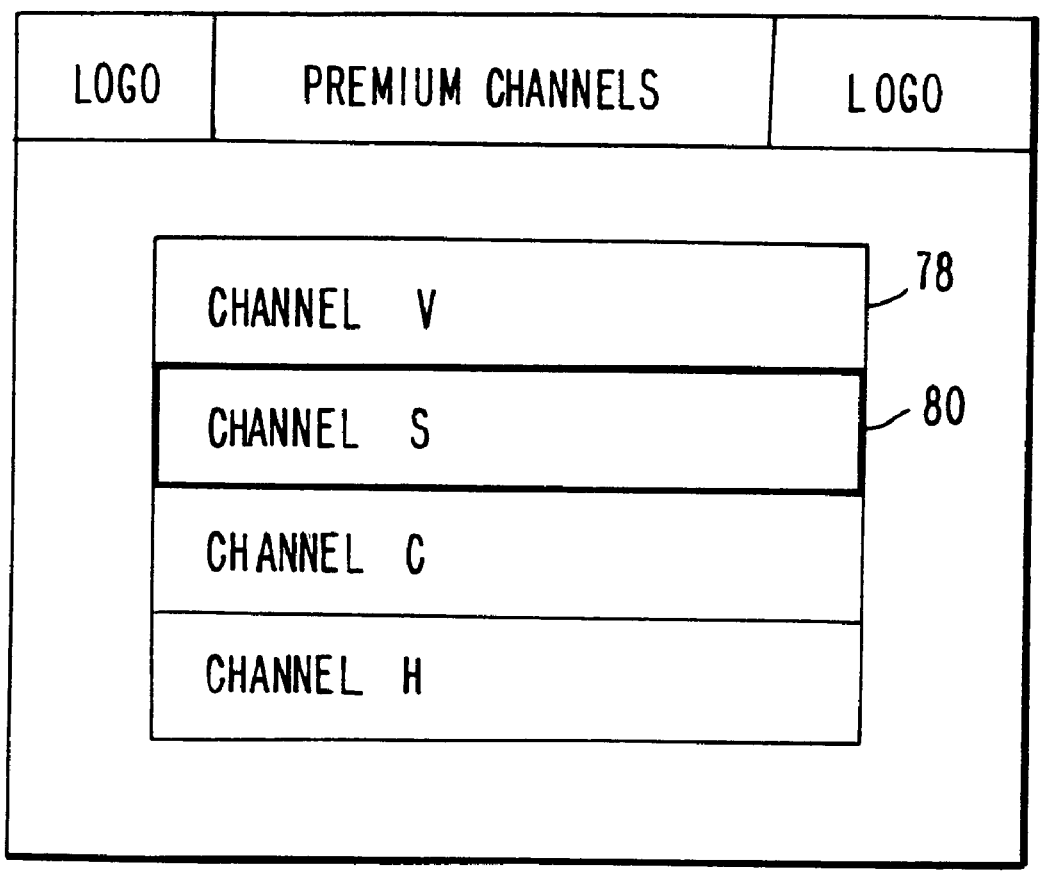
FIG. 9 is a view of an illustrative operator showcase television listings screen for displaying premium channels in accordance with the present invention.

An operator showcase television listings screen 76 that is suitable for promoting subscription television channels is shown in FIG. 9. The program guide displays television listings screen 76 when the user selects the television display screen option 54 in FIG. 3 entitled "premium channels." Television listings screen 76 includes a list 78 of various television channels to which the user may subscribe (e.g., on a monthly basis). The user can select a given channel using highlight region 80. Pressing the "info" button directs the program guide to display additional information on the selected channel. Pressing the "OK" button causes the program guide to display various order menus so that the user may confirm the purchase of a subscription to the selected channel.

Figure 10:
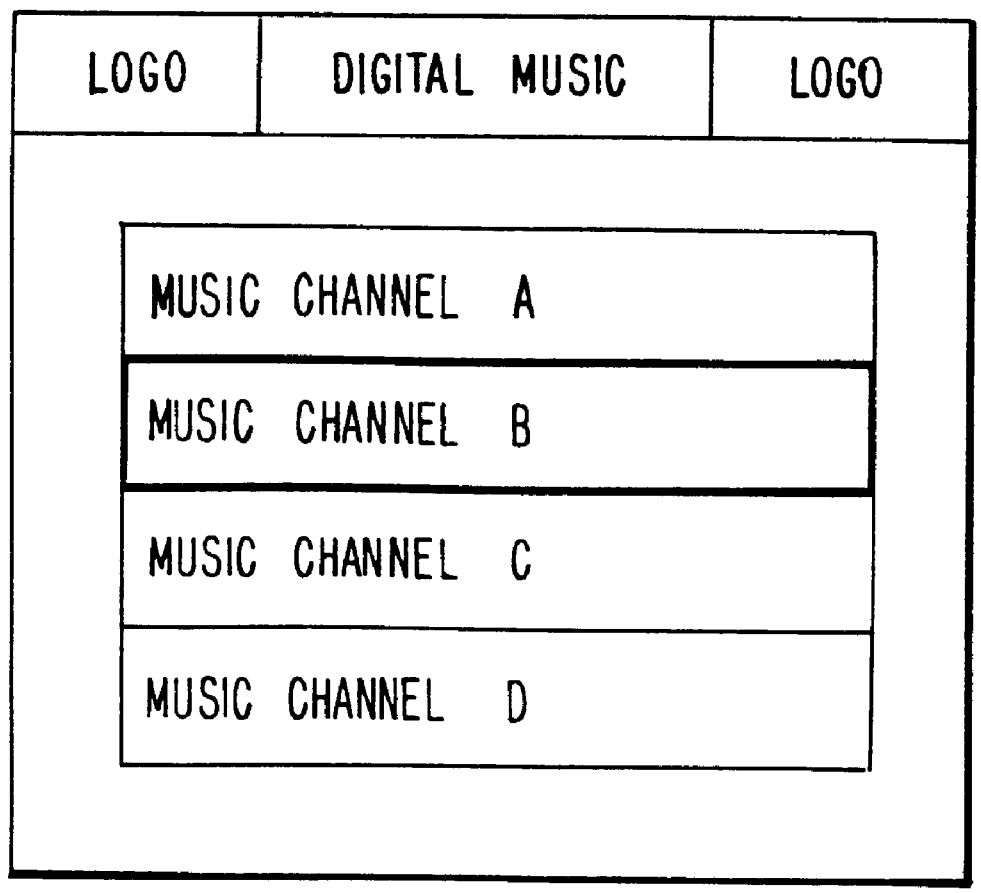
FIG. 10 is a view of an illustrative operator showcase television listings screen for displaying digital music channels in accordance with the present invention.

Another television display screen option 54 in FIG. 3 that may be selected is the option entitled "digital music." If the user selects the digital music option, a display screen such as operator showcase television listings screen 82 of FIG. 10 may be displayed on television 38. The user may select a given music channel using highlight region 84. The user may view additional information on the selected channel by pressing the "info" key. A subscription to the selected channel may be purchased by pressing the "OK" button and confirming purchase of the channel. After the user has purchased the desired music channel, set-top box 34 provides music that is played on audio system 45.

Sometimes programs or channels are made available to the user as part of a package. Various package types may be supported by the program guide. For example, pay programming may be provided in a "time block" package that allows a user to purchase a block of time on a particular channel, a "pay-per-day" package that includes multiple consecutive airings of a single program, a "special events" package that includes multiple components of special programming events, a "season ticket" package that includes all sports programs of a specific league or team for the duration of the sports season, a "premium multiplex" package that includes authorization for more than one premium subscription channel, an "a la carte" package that may includes authorization for a selectable subset of a number of subscription channels, etc.

When the user selects the television display screen option 54 of FIG. 3 entitled "sports packages," the user may be presented with operator showcase television listings screen 84 of FIG. 11. Television listings screen 84 may contain a list of dates and package titles for various sports packages that are available from the service provider. A user may select a desired package using highlight region 86. Pressing the "info" button directs the program guide to provide additional information on the selected package. Pressing the "OK" button directs the program guide to display ordering menus so that the user may purchase the package.

The television listings screens of FIGS. 4–11 are illustrative only. The actual screens used will depend upon the configuration options selected by the operator.

Figure 12:
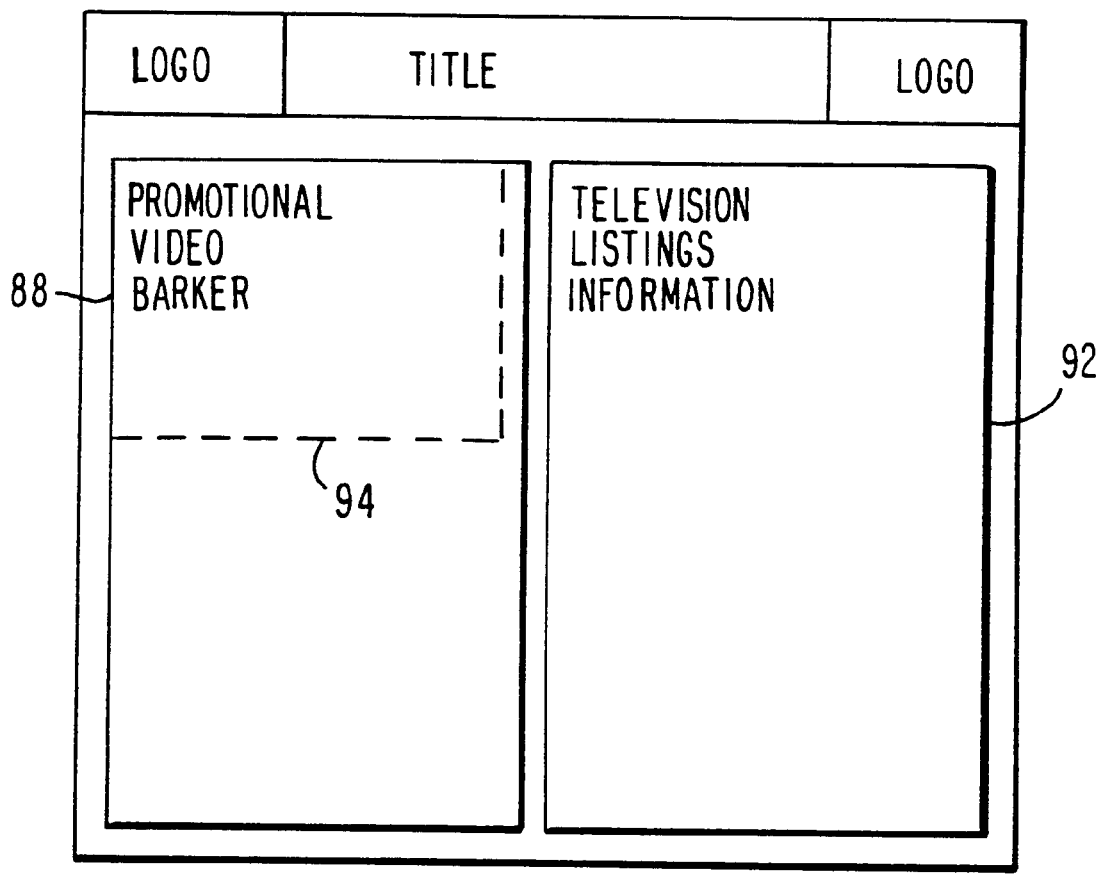
FIG. 12 is a view of an illustrative operator showcase television listings screen in which a promotional video barker and a set of television listings information are simultaneously displayed.

If desired, video may be displayed in an operator showcase television listings screen. For example, a promotional video barker 88 may be provided in an operator showcase television listings screen 90, as shown in FIG. 12. Television listings information 92 may be simultaneously displayed. Television listings information 92 may be program listings, subscription channel listings or listings for packages of programs or channels. The content of promotional video barker 88 is typically related in some way to the content of television listings information 92. For example, if television listings information contains a list of subscription channels that are available, promotional video barker 88 may contain promotional video clips of movies that are scheduled to be broadcast on those channels in the next month.

Figure 13:
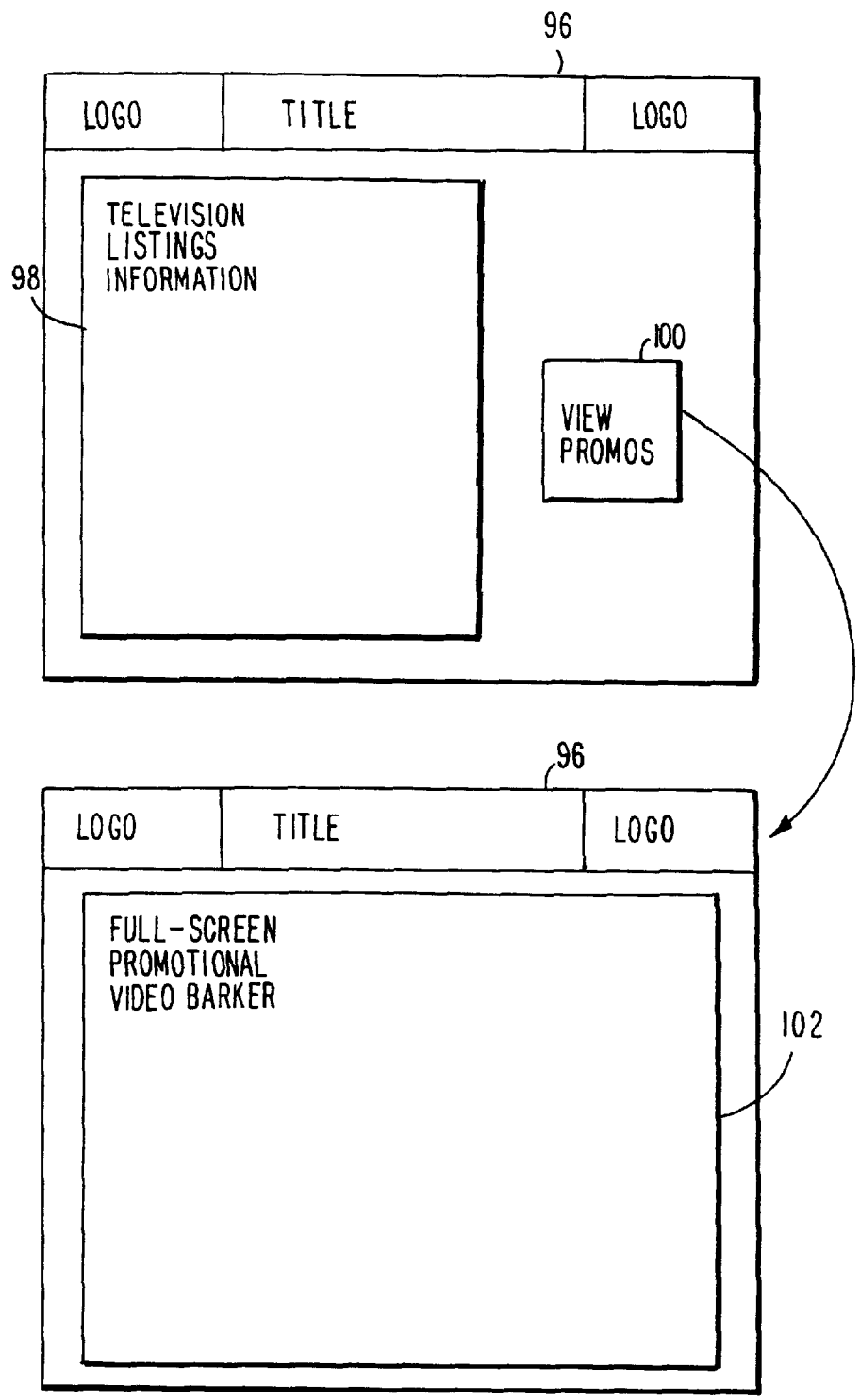
FIG. 13 is a view of a of an illustrative operator showcase television listings screen showing how a full-screen promotional video barker may be provided upon selecting a "view promos" option.

The service provider may configure the size of promotional video barker 88. For example, a quarter-screen promotional video barker 94 may be used in place of half-screen promotional video barker 88 if desired. A full-screen promotional video barker may be provided using the arrangement shown in FIG. 13. Initially, television listings screen 96 of FIG. 13 contains television listings information 98 and "view promos" option 100. Television listings information 98 may contain program listings, listings of subscription channels, or listings of packages of programs or channels. When the viewer selects "view promos" option 100 (or presses "OK" in response to a suitable prompt), the program guide displays full-screen promotional video barker 102 in place of television listings information 98 and "view promos" option 100.

The title, logos, content, and format of the operator showcase television listings screens may be customized by each service provider to accommodate the promotional needs of that service provider. The content of the listings in a given operator showcase television listings screen may be determined based on content criteria that have been selected by the service provider. The program guide maintains a database of current television listings data in memory in set-top box 34. When the user selects a television display screen option, the program guide uses the content criteria in a database query to generate a set of television listings information for the corresponding television listings screen.

For example, when the user selects a television display screen option entitled "sports packages," the program guide queries the database for all listings meeting the content criteria "sports" and "packages." Illustrative content criteria include children's programming, sporting events, instructional programming, pay-per-view programming, packages, channels, programs, premium programming, programming on a la carte channels, movies, documentaries, special events, or programming airing on a specified list of channels, etc. On a screen that lists channels, the operator may choose to show premium channels, a la carte channels, basic channels, video channels, audio channels, a specified list of channels, etc. These content criteria are illustrative only. Any other suitable content criteria may be used if desired.

The listings satisfying the content criteria selected by the service provider may be displayed in an operator showcase television listings screen according to a preselected format. For example, the television listings screens for sports packages may contain listings for sports packages in a time-ordered list without an accompanying promotional video barker. Illustrative listings formats include by-time ordering, by-channel ordering, alphabetical ordering, listings with and without accompanying promotional video barkers, listings with different sizes of promotional video barkers, listings screens with and without logos, titles, etc. Any other suitable listings formats may be used if desired.

Figure 14:
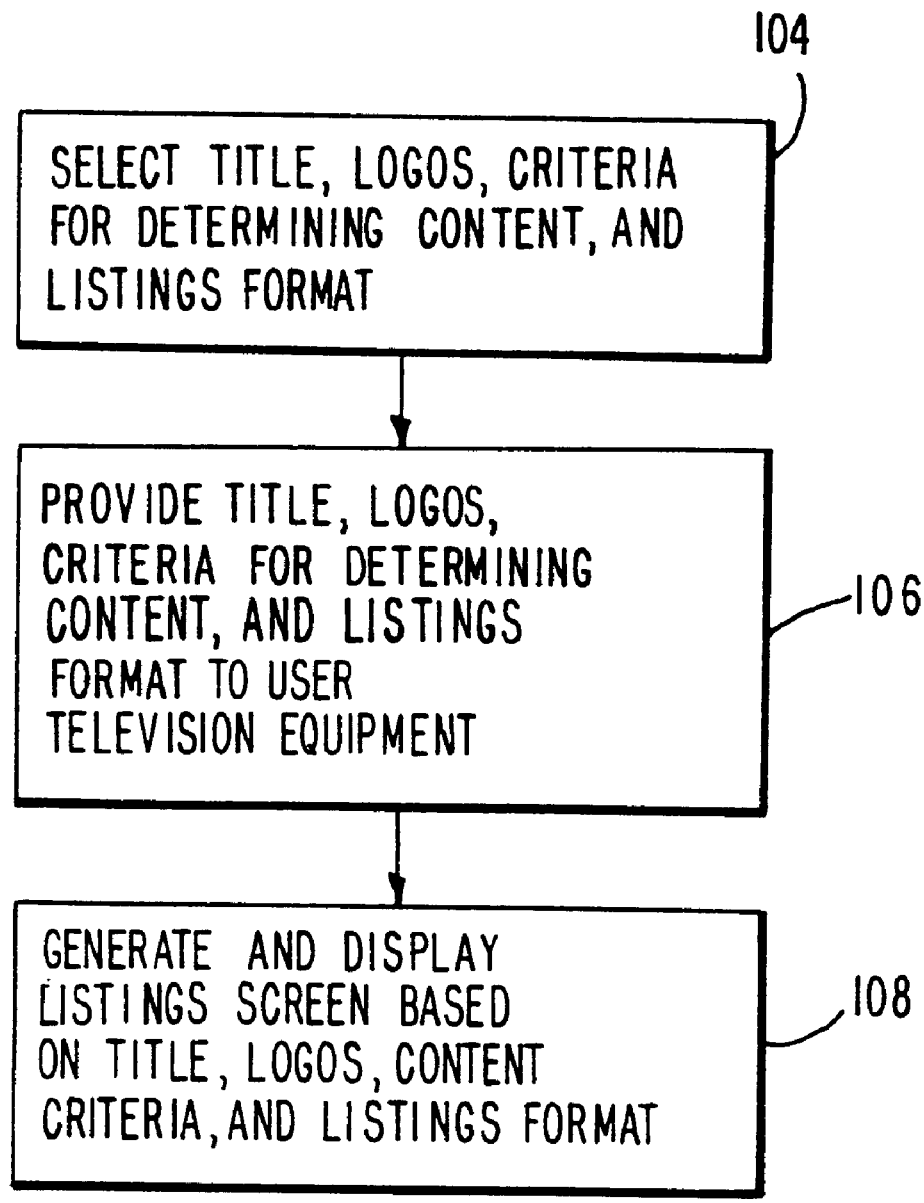
FIG. 14 is a flow chart of steps involved in defining an operator showcase television listings screen by selecting a title, logos, content criteria, and format.

Steps involved in customizing the operator showcase television listings screens are shown in FIG. 14. At step 104, the service provider selects various titles and logos to be used to brand the television listings screens. The service provider also selects the content criteria that are to be used to query the set-top box database when generating the sets of television listings information that will appear in the television listings screens. In addition, the service provider selects the formats to be used to display the various listings.

At step 106, the title, logos, content criteria, and display formats that were selected by the service provider for the operator showcase television listings screens are provided to set-top box 34 in user television equipment 32. The selections of the service provider may be provided to set-top box 34 using any suitable technique. For example, the selections of the service provider may be provided to main facility 22 on a diskette and incorporated into program guide database 24. Main facility 22 may then transmit the selections from program guide database 24 to television distribution facility 26, which may distribute the selections to various set-top boxes 34. Alternatively, the selections of the service provider may be provided directly to television distribution facility 26, from which they may be distributed to set-top boxes 34. These approaches are illustrative only and any other suitable technique for providing the selections of the service provider to the user television equipment may be used if desired.

When a user selects a given television display screen option, a corresponding operator showcase television listings screen is generated at step 108 based on the title, logos, content criteria, and listings format provided to set-top box 34 in step 106. The set of television listings information in the television listings screen is generated at step 108 using the content criteria selected by the service provider to perform a database query on the database of television listings data stored in set-top box 34.

The foregoing is merely illustrative of the principles of this invention and various modifications can be made by those skilled in the art without departing from the scope and spirit of the invention.

What is claimed is:

1. A system for providing an interactive television program guide on user equipment that contains a database of television listings data, the program guide displaying at least one operator showcase television listings screen on the user equipment based on content criteria selected by a service provider that operates a television distribution facility, comprising:

means for receiving at a main facility the content criteria selected by the service provider;

means for transmitting the content criteria from the main facility to the television distribution facility which distributes the content criteria to the user equipment;

means for displaying on the user equipment an operator showcase menu containing a plurality of television display screen options corresponding to the content criteria received by the user equipment, wherein each television display screen option is associated with a respective operator showcase television listings screen;

means for generating a set of television listings information for each operator showcase television listings screen from the television listings data in the database based on the content criteria provided to the user equipment, wherein each one of the content criteria identifies a specific type of program offering and is usable by the program guide in performing a database query in the database for generating an associated set of television listings information when an associated television display screen option corresponding to the specific type of program offering is selected; and means for displaying the set of television listings information in the operator showcase television listings screen on the user equipment.

2. The system defined in claim 1 wherein the service provider selects a format for the operator showcase television listings screen, the system further comprising:

means for providing the format selected by the service provider to the user equipment without intervention by the user; and means for displaying the set of television listings information in the operator showcase television listings screen according to the format provided to the user equipment.

3. The system defined in claim 1 wherein the service provider selects a title for the operator showcase television listings screen, the system further comprising:

means for providing the title selected by the service provider to the user equipment without intervention by the user; and means for displaying the set of television listings information in the operator showcase television listings screen with the title provided to the user equipment.

4. The system defined in claim 1 wherein the service provider selects a logo for the operator showcase television listings screen, the system further comprising:

means for providing the logo selected by the service provider to the user equipment without intervention by the user; and means for displaying the set of television listings information in the operator showcase television listings screen with the logo provided to the user equipment.

5. The system defined in claim 1 further comprising means for displaying a promotional video barker in the operator showcase television listings screen.

6. The system defined in claim 1 further comprising means for simultaneously displaying the set of television listings information and a promotional video barker in the operator showcase television listings screen.

7. The system defined in claim 1 wherein each operator showcase television listings screen contains television listings information, a title, a logo, and a promotional video barker.

8. The system defined in claim 1 further comprising means for providing the user with an opportunity to select an item in the displayed set of television listings information.

9. The system defined in claim 1 further comprising:

means for providing the user with an opportunity to select an item in the displayed set of television listings information; and means for providing the user with an opportunity to display additional information on the selected item.

10. The system defined in claim 1 further comprising:

means for providing the user with an opportunity to select an item in the displayed set of television listings information; and means for providing the user with an opportunity to purchase the selected item.

11. The system defined in claim 1 wherein one of the content criteria is pay programming.

12. The system defined in claim 1 wherein one of the content criteria is packages.

13. The system defined in claim 1 wherein one of the content criteria is channels.

14. The system defined in claim 1 wherein one of the content criteria is programs.

15. The system defined in claim 1 wherein one of the content criteria is sports programming.

16. The system defined in claim 1 wherein the service provider selects a format for the operator showcase television listings screen, the system further comprising:

means for providing the format selected by the service provider to the user equipment without intervention by the user; and means for displaying the set of television listings information in the operator showcase television listings screen according to the format provided to the user equipment, wherein the format includes a time-ordered program list.

17. The system defined in claim 1 wherein the service provider selects a format for the operator showcase television listings screen, the system further comprising:

means for providing the format selected by the service provider to the user equipment without intervention by the user; and means for displaying the set of television listings information in the operator showcase television listings screen according to the format provided to the user equipment, wherein the format includes an alphabetically-ordered program list.

18. A method for providing an interactive television program guide on user equipment that contains a database of television listings data, the program guide displaying at least one operator showcase television listings screen on the user equipment based on content criteria selected by a service provider that operates a television distribution facility, comprising:

receiving at a main facility the content criteria selected by the service provider;

transmitting the content criteria from the main facility to the television distribution facility which distributes the content criteria to the user equipment;

displaying on the user equipment an operator showcase menu containing a plurality of television display screen options corresponding to the content criteria received by the user equipment, wherein each television display screen option is associated with a respective operator showcase television listings screen;

generating a set of television listings information for each operator showcase television listings screen from the television listings data in the database based on the content criteria provided to the user equipment, wherein each one of the content criteria identifies a specific type of program offering and is usable by the program guide in performing a database query in the database for generating an associated set of television listings information when an associated television display screen option corresponding to the specific type of program offering is selected; and displaying the set of television listings information in the operator showcase television listings screen on the user equipment.

19. The method defined in claim 18 wherein the service provider selects a format for the operator showcase television listings screen, the method further comprising:

providing the format selected by the service provider to the user equipment without intervention by the user; and displaying the set of television listings information in the operator showcase television listings screen according to the format provided to the user equipment.

20. The method defined in claim 18 wherein the service provider selects a title for the operator showcase television listings screen, the method further comprising:

providing the title selected by the service provider to the user equipment without intervention by the user; and displaying the set of television listings information in the operator showcase television listings screen with the title provided to the user equipment.

21. The method defined in claim 18 wherein the service provider selects a logo for the operator showcase television listings screen, the method further comprising:

providing the logo selected by the service provider to the user equipment without intervention by the user; and displaying the set of television listings information in the operator showcase television listings screen with the logo provided to the user equipment.

22. The method defined in claim 18 further comprising displaying a promotional video barker in the operator showcase television listings screen.

23. The method defined in claim 18 further comprising simultaneously displaying the set of television listings information and a promotional video barker in the operator showcase television listings screen.

24. The method defined in claim 18 wherein each operator showcase television listings screen contains television listings information, a title, a logo, and a promotional video barker.

25. The method defined in claim 18 further comprising providing the user with an opportunity to select an item in the displayed set of television listings information.

26. The method defined in claim 18 further comprising:

providing the user with an opportunity to highlight a selected item in the displayed set of television listings information; and providing the user with an opportunity to display additional information on the selected item.

27. The method defined in claim 18 further comprising:

providing the user with an opportunity to highlight a selected item in the displayed set of television listings information; and providing the user with an opportunity to purchase the selected item.

28. The method defined in claim 18 wherein one of the content criteria is pay programing.

29. The method defined in claim 18 wherein one of the content criteria is packages.

30. The method defined in claim 18 wherein one of the content criteria is channels.

31. The method defined in claim 18 wherein one of the content criteria is programs.

32. The method defined in claim 18 wherein one of the content criteria is sports programming.

33. The method defined in claim 18 wherein the service provider selects a format for the operator showcase television listings screen, the method further comprising:

providing the format selected by the service provider to the user equipment without intervention by the user; and displaying the set of television listings information in the operator showcase television listings screen according to the format provided to the user equipment, wherein the format includes a time-ordered program list.

34. The method defined in claim 18 wherein the service provider selects a format for the operator showcase television listings screen, the method further comprising:

providing the format selected by the service provider to the user equipment without intervention by the user; and displaying the set of television listings information in the operator showcase television listings screen according to the format provided to the user equipment, wherein the format includes an alphabetically-ordered program list.

35. The system defined in claim 1 wherein the user equipment is user television equipment.

36. The method defined in claim 18 wherein the user equipment is user television equipment.

37. A system for providing an interactive television program guide on user equipment that contains a database of television listings data, the program guide displaying at least one operator showcase television listings screen on the user equipment based on content criteria selected by a service provider that operates a television distribution facility, comprising:

a main facility that receives the content criteria selected by the service provider, wherein the content criteria is subsequently transmitted from the main facility to the television distribution facility which distributes the content criteria to the user equipment, wherein the user equipment:

displays an operator showcase menu containing a plurality of television display screen options corresponding to the content criteria received by the user equipment, wherein each television display screen option is associated with a respective operator showcase television listings screen;

generates a set of television listings information for each operator showcase television listings screen from the television listings data in the database based on the content criteria provided to the user equipment, wherein each one of the content criteria identifies a specific type of program offering and is usable by the program guide in performing a database query in the database for generating an associated set of television listings information when an associated television display screen option corresponding to the specific type of program offering is selected; and displays the set of television listings information in the operator showcase television listings screen.

38. The system defined in claim 37 wherein the service provider selects a format for the operator showcase television listings screen, wherein the format is provided to the user equipment without intervention by the user and the set of television listings information in the operator showcase television listings screen is displayed according to the format provided to the user equipment.

39. The system defined in claim 37 wherein the service provider selects a title for the operator showcase television listings screen, wherein the title selected by the service provider is provided to the user equipment without intervention by the user and the set of television listings information in the operator showcase television listings screen is displayed with the title provided to the user equipment.

40. The system defined in claim 37 wherein the service provider selects a logo for the operator showcase television listings screen, wherein the logo selected by the service provider is provided to the user equipment without intervention by the user, and the set of television listings information in the operator showcase television listings screen is displayed with the logo provided to the user equipment.

41. The system defined in claim 37 wherein the program guide displays a promotional video barker in the operator showcase television listings screen.

42. The system defined in claim 37 wherein the program guide simultaneously displays the set of television listings information and a promotional video barker in the operator showcase television listings screen.

43. The system defined in claim 37 wherein each operator showcase television listings screen contains television listings information, a title, a logo, and a promotional video barker.

44. The system defined in claim 37 wherein the program guide provides the user with an opportunity to select an item in the displayed set of television listings information.

45. The system defined in claim 37 wherein the program guide provides the user with an opportunity to select an item in the displayed set of television listings information and provides the user with an opportunity to display additional information on the selected item.

46. The system defined in claim 37 wherein the program guide provides the user with an opportunity to select an item in the displayed set of television listings information, and provides the user with an opportunity to purchase the selected item.

47. The system defined in claim 37 wherein one of the content criteria is pay programing.

48. The system defined in claim 37 wherein one of the content criteria is packages.

49. The system defined in claim 37 wherein one of the content criteria is channels.

50. The system defined in claim 37 wherein one of the content criteria is programs.

51. The system defined in claim 37 wherein one of the content criteria is sports programming.

52. The system defined in claim 37 wherein the service provider selects a format for the operator showcase television listings screen, wherein the format selected by the service provider is provided to the user equipment without intervention by the user, wherein the set of television listings information in the operator showcase television listings screen is displayed according to the format provided to the user equipment, and wherein the format includes a time-ordered program list.

53. The system defined in claim 37 wherein the service provider selects a format for the operator showcase television listings screen, wherein the format selected by the service provider is provided to the user equipment without intervention by the user, wherein the set of television listings information in the operator showcase television listings screen is displayed according to the format provided to the user equipment, and wherein the format includes an alphabetically-ordered program list.

54. The system defined in claim 37 wherein the user equipment is user television equipment.

* * * * *

UNITED STATES PATENT AND TRADEMARK OFFICE
CERTIFICATE OF CORRECTION

PATENT NO. : 6,604,240 B2
DATED : August 5, 2003
INVENTOR(S) : Micheal D. Ellis et al.

It is certified that error appears in the above-identified patent and that said Letters Patent is hereby corrected as shown below:

Title page,
Item [56], U.S. PATENT DOCUMENTS, change "5,579,055 A 11/1996" to -- 5,579,055 A 9/1997 --.
Item [57], ABSTRACT,
Line 16, change "therefore by customized" to -- therefore be customized --

Column 2,
Line 16, change "channel-ordered, list" to -- channel-ordered list --.

Column 4,
Line 46, change "by passed" to -- be passed --.

Column 7,
Line 13, change "may includes" to -- may include --.

Signed and Sealed this

Sixth Day of January, 2004

JAMES E. ROGAN
*Director of the United States Patent and Trademark Office*